United States Patent
Lin et al.

(10) Patent No.: US 10,086,904 B2
(45) Date of Patent: Oct. 2, 2018

(54) BICYCLE REAR DERAILLEUR

(71) Applicants: LEE CHI ENTERPRISES CO., LTD., Changhua (TW); The Cycle Group Inc., Anaheim, CA (US)

(72) Inventors: Yen-Chi Lin, Changhua (TW); Shan-Lin Wu, Changhua (TW); Yu-Hung Pan, Changhua (TW)

(73) Assignees: LEE CHI ENTERPRISES CO., LTD., Changhua (TW); THE CYCLE GROUP INC., Anaheim, CA (US)

( * ) Notice: Subject to any disclaimer, the term of this patent is extended or adjusted under 35 U.S.C. 154(b) by 335 days.

(21) Appl. No.: 14/992,982

(22) Filed: Jan. 11, 2016

(65) Prior Publication Data

US 2017/0113760 A1 Apr. 27, 2017

(30) Foreign Application Priority Data

Oct. 23, 2015 (TW) .............................. 104134847 A (51) Int. Cl.
  B62M 9/1248 (2010.01)
  B62M 9/124 (2010.01)
  B62M 9/125 (2010.01)
  B62M 9/128 (2010.01)

(52) U.S. Cl.
  CPC .......... B62M 9/1248 (2013.01); B62M 9/124 (2013.01); B62M 9/125 (2013.01); B62M 9/128 (2013.01)

(58) Field of Classification Search
  CPC .... B62M 9/124; B62M 9/1248; B62M 9/125; B62M 9/128

USPC ........................................................... 474/80
See application file for complete search history.

(56) References Cited

U.S. PATENT DOCUMENTS

| 7,674,198 | B2 | 3/2010 | Yamaguchi |
| 7,871,346 | B2 | 1/2011 | Takachi et al. |
| 8,852,041 | B2 | 10/2014 | Yamaguchi et al. |
| 8,870,692 | B2 | 10/2014 | Yamaguchi et al. |
| 9,463,846 | B2* | 10/2016 | Chang .................... B62M 9/121 |
| 2009/0054183 | A1 | 2/2009 | Takachi et al. |
| 2016/0167739 | A1* | 6/2016 | Watarai .................. B62M 9/127 |
| | | | 474/80 |

(Continued)

FOREIGN PATENT DOCUMENTS

CN 104554606 A 4/2015

*Primary Examiner* — William E Dondero
*Assistant Examiner* — Mark K Buse
(74) *Attorney, Agent, or Firm* — patenttm.us (57) ABSTRACT

A bicycle rear derailleur has a mounting base, a moveable base, and a friction assembly. The moveable base has an axle. The friction assembly is mounted in the moveable base and has a driving disk, a driven disk, multiple rotating members, and a friction member. The driving disk is connected with the axle in a non-rotatable manner. The driven disk is rotatably and axially moveably mounted in the moveable base. Each disk has multiple curved rotating member guiding recesses. Each rotating member guiding recess of the driving disk has a depth decreased along a first rotating direction. Each rotating member guiding recess of the driven disk has a depth decreased along a second rotating direction. The rotating members are mounted respectively in the rotating member guiding recesses. The friction member is mounted in the moveable base in a non-rotatable manner and abuts the driven disk.

14 Claims, 11 Drawing Sheets

(56) References Cited

U.S. PATENT DOCUMENTS

2017/0174289 A1\* 6/2017 Wu ..................... B62M 9/1242

\* cited by examiner

BICYCLE REAR DERAILLEUR

BACKGROUND OF THE INVENTION

1. Field of the Invention

The present invention relates to a bicycle derailleur, and more particularly to a bicycle rear derailleur.

2. Description of Related Art

A rear derailleur is mounted on a rear fork of a bicycle and is connected with a derailleur lever or a derailleur sleeve mounted on a handle of the bicycle to switch the chain between sprocket wheels on the bicycle. A conventional rear derailleur substantially comprises a mounting base, a moveable base, and a chain guide. The mounting base is mounted on a frame of the bicycle. The moveable base is connected to the mounting base by a linkage assembly. The chain guide is connected to the mounting base. When the moveable base is moved relative to the mounting base, the chain guide can switch the chain between the sprocket wheels so as to change the gear of the bicycle. For example, U.S. Pat. Nos. 7,674,198 and 7,871,346 disclose conventional rear derailleur.

The chain guide is swingable relative to the mounting base and provides a pre-torsion in counterclockwise to a spring. Accordingly, when the chain is switched to a sprocket wheel having a small diameter from a sprocket wheel having a large diameter, the chain can be tightened to prevent the chain from escaping from the sprocket wheels. However, when the bicycle is riding in a rugged road condition, the chain guide may be rotated in counterclockwise and the chain may be loosened. To prevent the chain guide from being loosened, a rear derailleur with rotation resistance is provided, for example US Patent Publication No. 2009/0054183, U.S. Pat. No. 8,852,041, U.S. Pat. No. 8,870,692, or China Patent Publication No. 104554606A.

In US Patent Publication No. 2009/0054183, a friction assembly is mounted on a moveable base to provide a friction to a chain guide. The friction assembly substantially comprises a friction unit, a unidirectional clutch, and an adjusting unit. The friction comprises a first connection board and a second connection board connected by multiple friction boards. When the chain guide that is connected to the mounting base is rotated in counterclockwise, the friction assembly can provide friction to the chain guide to keep the chain in a stable condition. However, the fiction assembly of the '183 Patent is complicated in structure and is difficult to assembled, and the friction provided by the friction assembly cannot be adjusted.

Figure 12:
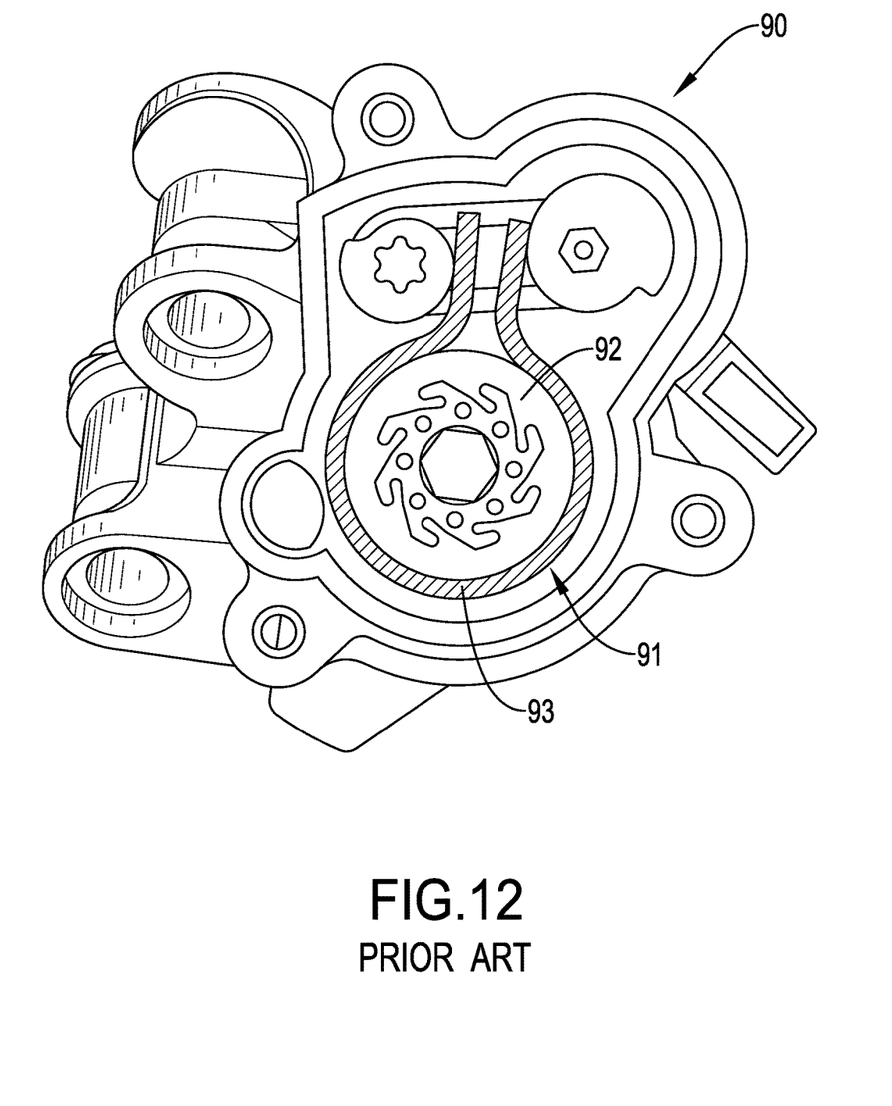
FIG. 12 is a respective view in partial section of a rear derailleur of U.S. Pat. No. 8,852,041.

With reference to FIG. 12, in U.S. Pat. No. 8,852,041 and U.S. Pat. No. 8,870,692, a friction assembly 91 is mounted in a moveable base 90, and the friction assembly 91 comprises a rotatable unidirectional clutch 92 and a friction unit 93. The unidirectional clutch 92 is connected to a rotating axle driven by a chain guide and provides a friction to the chain guide in a pre-determined direction. The friction unit 93 has a Ω shape and a circular friction applying segment mounted around the unidirectional clutch 92 to provide a friction to a rotation of the unidirectional clutch 92. However, the large space is necessary for assembling the friction assembly 91, so the volume of the mounting base 90 has to be enlarged. In addition, the circular friction applying segment cannot provide a stable friction to the unidirectional clutch 92, and the friction provided by the friction assembly 91 cannot be adjusted.

In China Patent Publication No. 104554606A, a friction assembly is mounted in a mounting base, and the friction assembly comprises a friction unit and a clutch assembly. The clutch assembly comprises a first clutch and a second clutch. The first clutch is connected with an axle driven by a chain guide in a torque-transmitting manner. The second clutch has an axial cylindrical protrusion. The friction unit comprises a circular segment mounted around the axial cylindrical protrusion of the second clutch and two free ends. The friction unit can provide a friction to the rotation of the clutch assembly, and the friction can also be applied to the rotation of the chain guide. However, the friction unit of the '606 Patent has a Ω space, and a large space for assembling the friction assembly is necessary. The friction provided by the circular segment of the friction unit is unstable, and the friction provided by the friction assembly is not adjustable.

To overcome the shortcomings, the present invention tends to provide a rear derailleur to mitigate or obviate the aforementioned problems.

SUMMARY OF THE INVENTION

The main objective of the invention is to provide a bicycle rear derailleur that is adjustable in friction.

The bicycle rear derailleur has a mounting base, a moveable base, a chain guide, and a friction assembly. The moveable base is moveably connected with the mounting base and has an axle and a torsion spring. The axle is mounted in the moveable base. The chain guide is connected with the axle in a non-rotatable manner and is applied with a recoil force provided by the torsion spring in a first rotating direction. The friction assembly is mounted in the moveable base to provide a friction to the axle and has a driving disk, a driven disk, multiple rotating members, and a friction member. The driving disk is connected with the axle in a non-rotatable manner. The driven disk is rotatably and axially moveably mounted in the moveable base and is adjacent to the driving disk. The driving disk has multiple curved rotating member guiding recesses defined in the driving disk at a side facing the driven disk and arranged around a center of the driving disk. Each rotating member guiding recess has a depth decreased along the first rotating direction. The driven disk has multiple curved rotating member guiding recesses defined in the driven disk at a side facing the driving disk and arranged around a center of the driven disk. Each rotating member guiding recess of the driven disk has a depth decreased along a second rotating direction opposite to the first rotating direction. The rotating members are mounted respectively in the rotating member guiding recesses in the driving and driven disks. The friction member is mounted in the moveable base in a non-rotatable manner and abuts the driven disk.

Other objects, advantages and novel features of the invention will become more apparent from the following detailed description when taken in conjunction with the accompanying drawings.

DETAILED DESCRIPTION OF PREFERRED EMBODIMENT

A rear derailleur in accordance with the present invention is mounted on a rear fork 70 of a bicycle at a position being adjacent to a rear wheel axle 71 to drive a chain to switch between multiple sprocket wheels 72. With reference to FIGS. 1 to 5, the rear derailleur comprises a mounting base 10, a linkage assembly 20, a moveable base 30, a chain guide 40, and a friction assembly 60.

Figure 1:
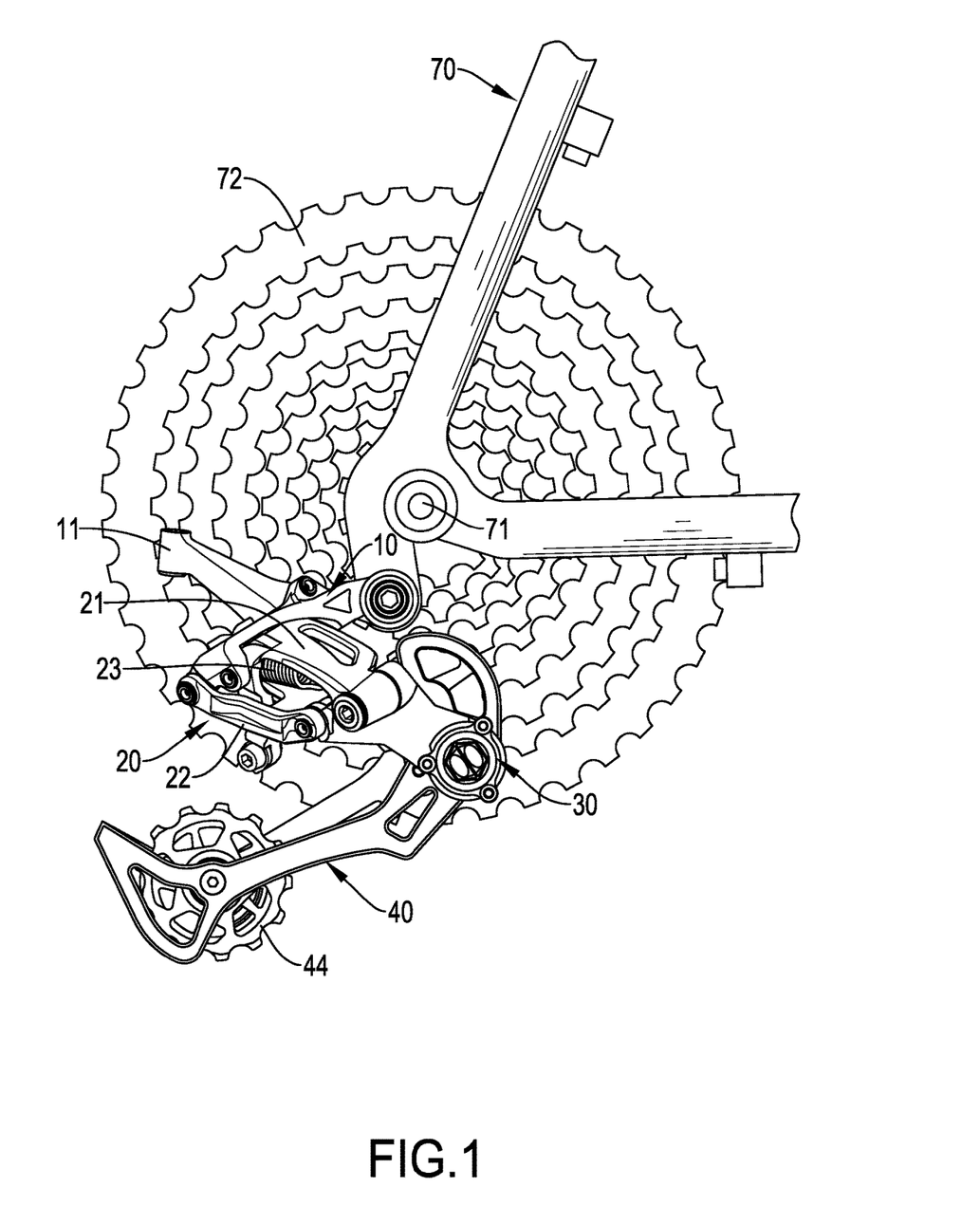
FIG. 1 is a perspective view of a rear derailleur in accordance with the present invention mounted on a rear fork of a bicycle.
Figure 2:
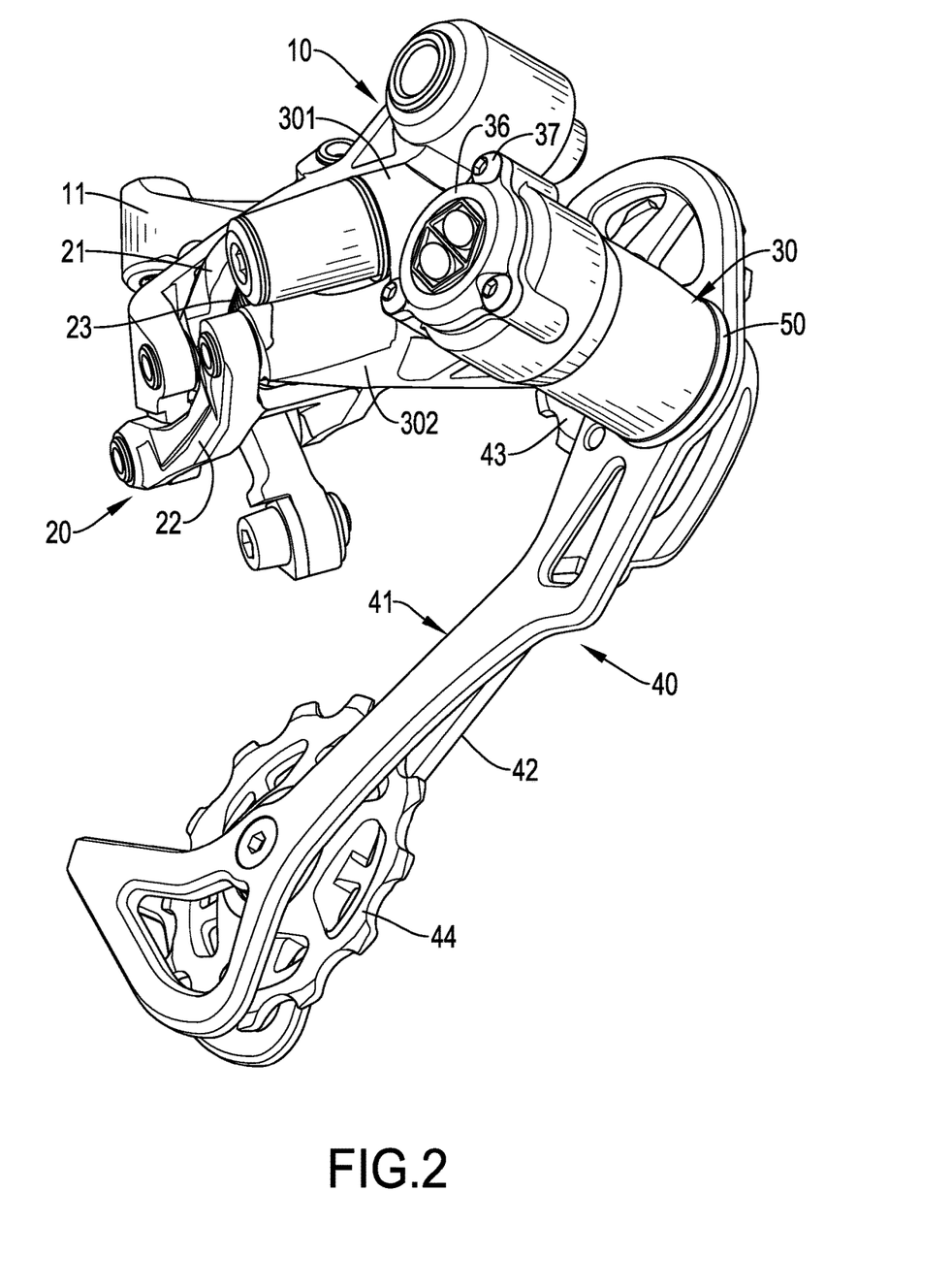
FIG. 2 is a perspective view the rear derailleur in FIG. 1.

With reference to FIGS. 1 and 2, the mounting base 10 is mounted on the rear fork 70 and has a cable arm 11 to connect with and position a cable. The linkage assembly 20 is connected to the mounting base 10 and comprises a first lever 21 and a second lever 22 substantially parallel with the first lever 21. The moveable base 30 is moveably connected with the mounting base 10 and has a first connection arm 301 and a second connection arm 302 spaced from each other. One end of each one of the first leave lever 21 and the second lever 22 are pivotally connected with the mounting base 10, and the other end of each one of the first lever 21 and the second lever 22 are respectively connected pivotally with the first connection arm 301 and the second connection arm 302. Accordingly, a four-bar linkage is implemented by the mounting base 10, the linkage assembly 20 and the moveable base 30. A pulling spring 23 is connected between the mounting base 10 and the moveable base 30, such that the moveable base 30 can be kept at a minimum interval relative to the mounting base 10.

Figure 3:
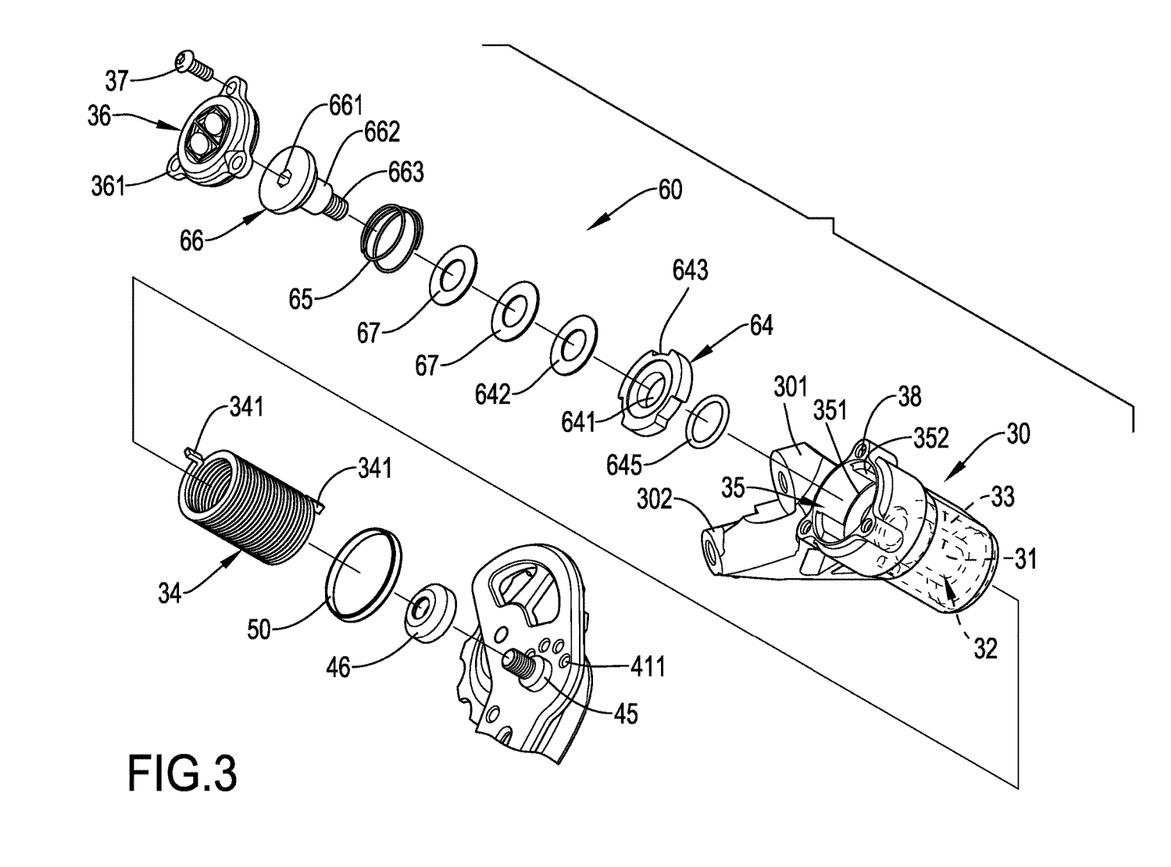
FIG. 3 is an exploded perspective view of a first embodiment of a moveable base and a friction assembly of the rear derailleur in FIG. 2.

With reference to FIGS. 2 and 3, the chain guide 40 has a first holding arm 41 and a second holding arm 42 substantially parallel with the first holding arm 41. A guiding sprocket 43 and a tightening sprocket 44 are respectively mounted ends of the first holding arm 41 and the second holding arm 42. A connection bolt 45 is mounted through the guiding sprocket 43 and is connected to the moveable base 30. Three engaging holes 411 are defined in the first holding arm 41 and are arranged around the connection bolt 45. A bearing 46 is mounted around the connection bolt 45 to improve the smoothness of the rotation of the chain guide 40 relative to the moveable base 10. An O-ring 50 is mounted between the moveable base 30 and the first holding arm 41.

The mounting base 10, the linkage assembly 20, and the chain guide 40 may be conventional, so detail description thereof is omitted.

Figure 4:
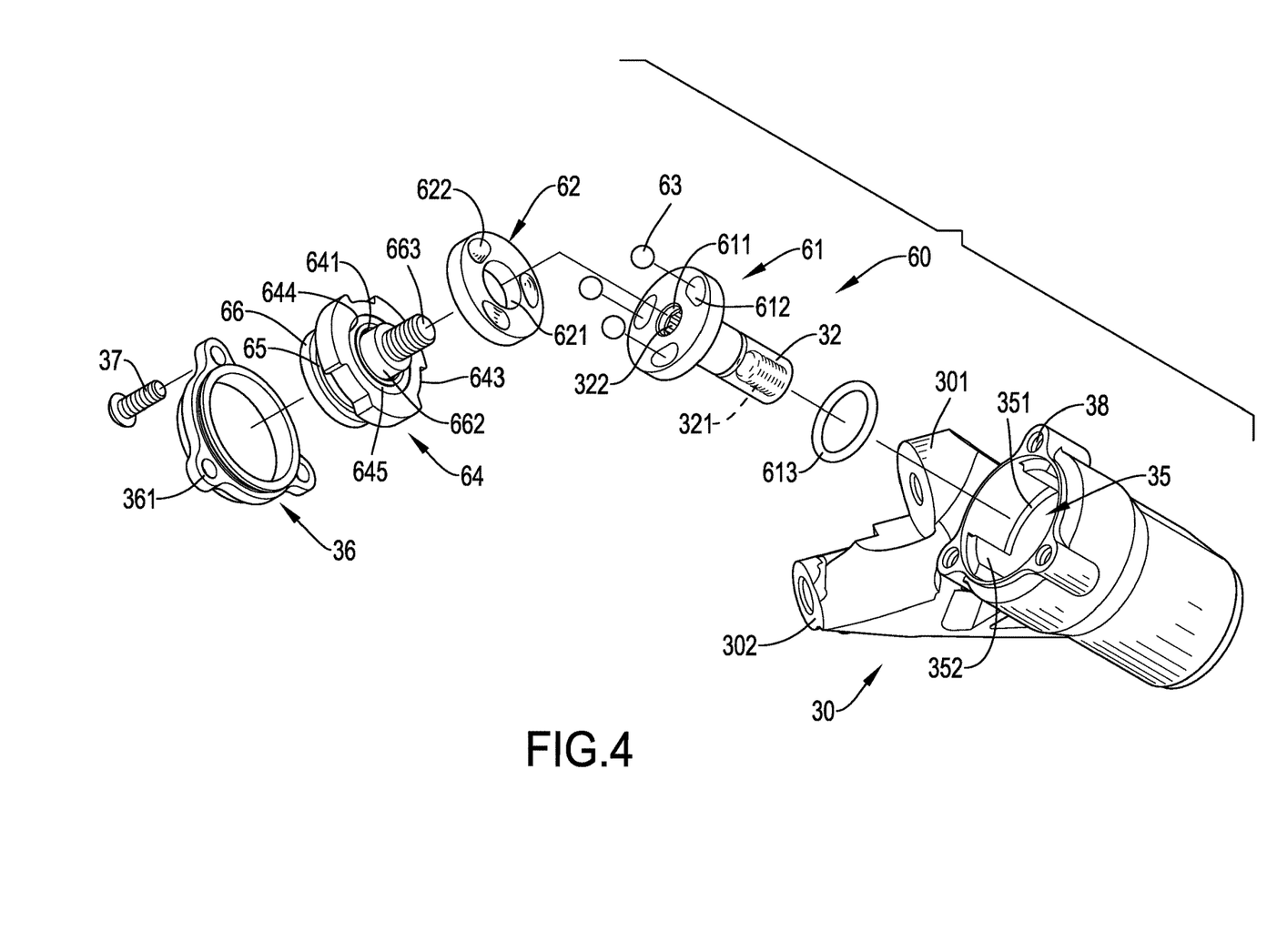
FIG. 4 is an enlarged exploded perspective view of the friction assembly in FIG. 3.
Figure 5:
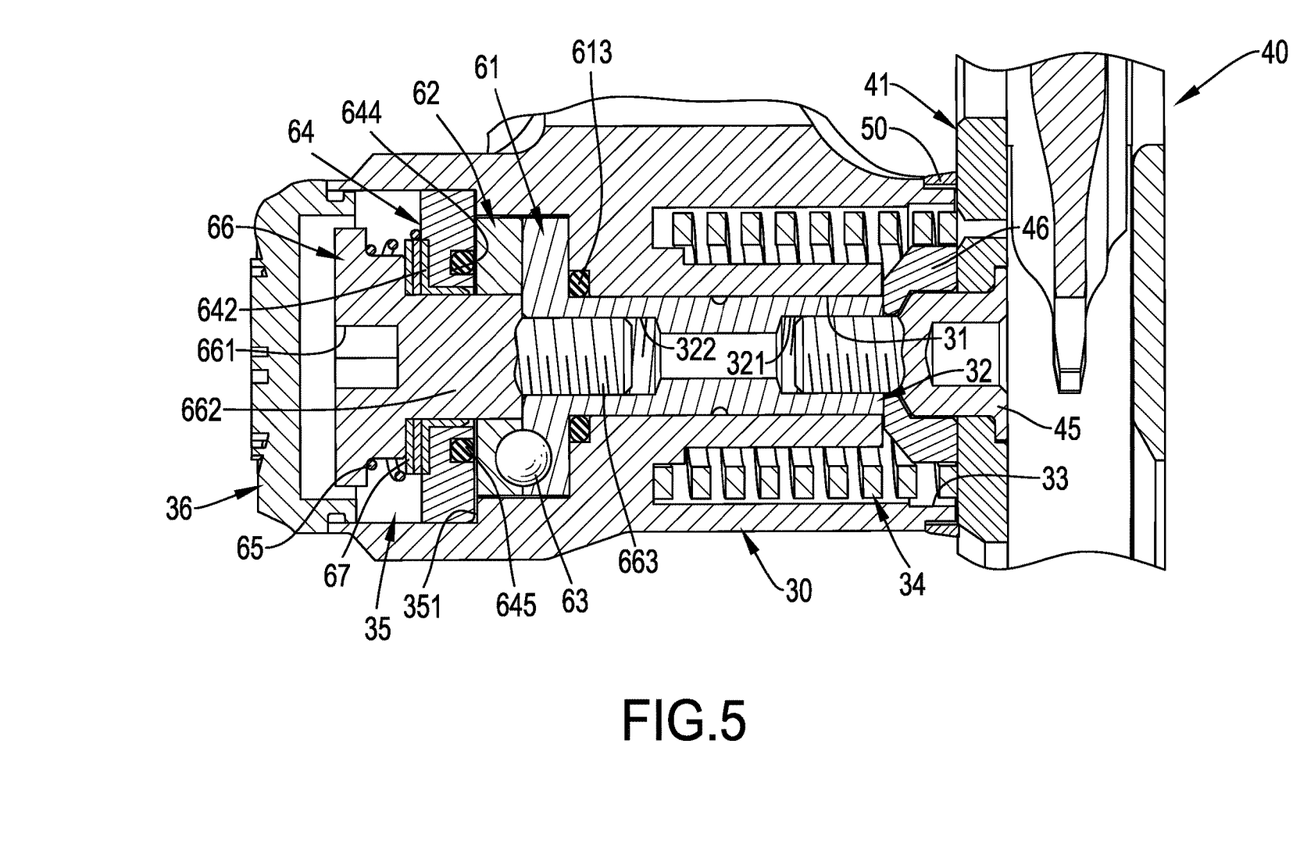
FIG. 5 is an enlarged side view in partial section of the moveable base and the friction assembly of the rear derailleur in FIG. 3.

With reference to FIGS. 3 to 5, the movable base 30 comprises an axle hole 31, an axle 32, a spring receiving recess 33, a torsion spring 34, a holding recess 35, a protective cap 36, and multiple bolts 37.

The axle hole 31 is defined in the moveable base 30 and is axially aligned with the connection bolt 45 of the chain guide 40. The axle 32 is rotatably mounted through the axle hole 31. The axle 32 has two ends provided respectively with a first threaded hole 321 and a second threaded hole 322. The connection bolt 45 of the chain guide 40 is screwed with the first threaded hole 321 that faces to the chain guide 40, such that the axle 32 is connected with the chain guide 40 in a non-rotatable manner. The spring receiving recess 33 is defined in the moveable base 30 at a side facing the chain guide 40 and is defined around the axle hole 31. The torsion spring 34 is mounted in the spring receiving recess 33 and has two ends provided respectively with an engaging rod 341. The engaging rods 341 of the torsion spring 34 are engaged respectively with an inner end of the spring receiving recess 33 and one of the engaging holes 411. Such that, the torsion spring 34 can provide a recoil force in a first rotating direction to the chain guide 40, and the chain guide 40 can keep the chain in a tightened condition. In the first embodiment, the first rotating direction is clockwise, and a second rotating direction is counterclockwise.

The holding recess 35 is defined in the moveable base 30 at an end opposite the chain guide 40 and is axially aligned and communicates with the axle hole 31. The holding recess 35 has a diameter larger than that of the axle hole 31. A shoulder 351 is formed in a middle segment of the holding recess 35, such that the holding recess 35 is divided into an inner segment and an outer segment having a diameter larger than that of the inner segment. The holding recess 35 has three protrusions 352 longitudinally formed on and protruding from an inner surface of the inner segment of the holding recess 35. The protective cap 36 is mounted on the moveable base 30 at the end opposite the chain guide 40 and closes the holding recess 35. Three ears 361 respectively provided with a bore are formed around the protective cap 36 at even angular intervals. Three bolts 37 are mounted respectively through the bores in the ears 361 on the protective cap 36 and are screwed respectively with three threaded holes 38 defined in the moveable base 30, such that the protective cap 36 is securely mounted and positioned on the moveable base 30.

With reference to FIGS. 3 to 5, and 7, the friction assembly 60 is mounted in the holding recess 35 in the moveable base 30 to provide a friction to the axle 32 and comprises a driving disk 61, a driven disk 62, three rotating members 63, a friction member 64, a preload spring 65, and an adjusting bolt 66. The driving disk 61 is mounted in the inner segment of the holding recess 35 and is connected with an end of the axle 32 in a non-rotatable manner. Preferably, the driving disk 61 may be integrally formed with the axle 32 as a single part or the driving disk 61 and the axle 32 may be two individual elements connected with each other. In the embodiment shown in FIGS. 4 to 6, the driving disk 61 is integrally formed with the axle 32 as a single part. The driving disk 61 has a central hole 611 defined in a center of the driving disk 61 and communicating with the second threaded hole 322 in the axle 32. The driving disk 61 has three curved rotating member guiding recesses 612 defined in the driving disk 61 at a side facing the protective cap 36 and arranged around the central hole 611 of the driving disk 61. Each rotating member guiding recess 612 has a depth gradually increased along the second rotating direction (counterclockwise). Thus, each rotating member guiding recess 612 has a deep end corresponding to the second rotating direction. Each rotating member guiding recess 612 has a slope gradually decreased along the first rotating direction (clockwise). A side of the driving disk 61 facing the axle 32 abuts with a bottom of the holding recess 35. An O-ring 613 is mounted between the driving disk 61 and the bottom of the holding recess 35.

Figure 6:
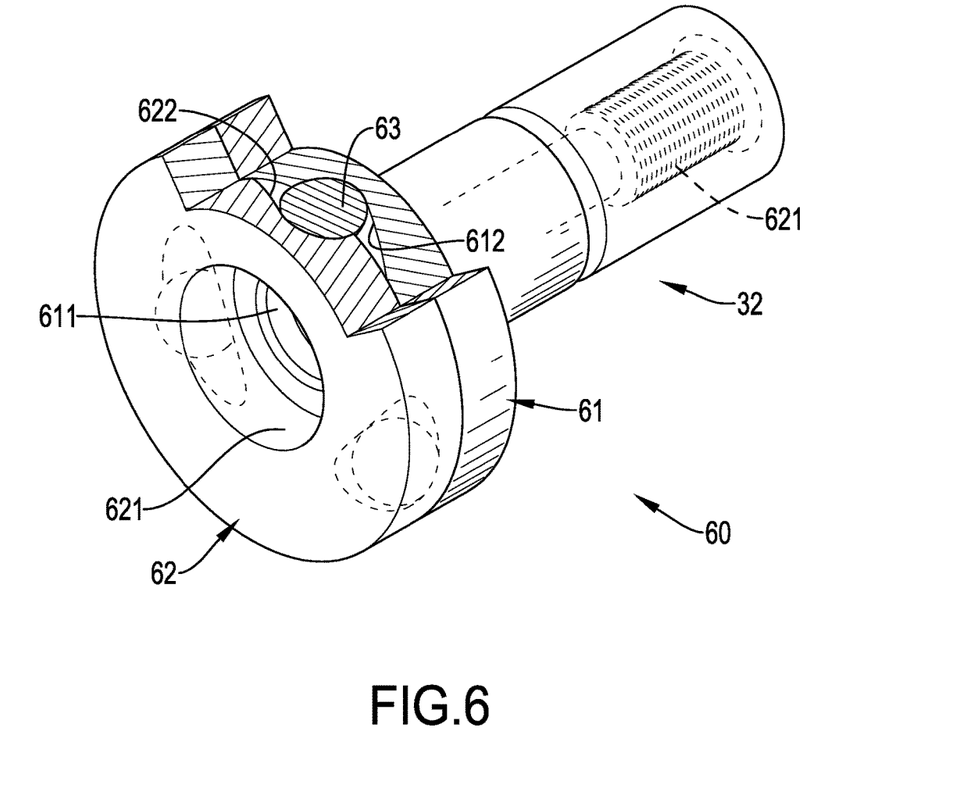
FIG. 6 is an enlarged perspective view in partial section of the driving disk and a driven disk of the friction assembly in FIG. 3.

With reference to FIGS. 4 to 6, the driven disk 62 is rotatably and axially moveably mounted in the inner segment of the holding recess 35 and is adjacent to the driving disk 61. The driven disk 62 has a central hole 621 defined through the center of the driven disk 62. The driven disk 62 has three curved rotating member guiding recesses 622 defined in the driven disk 62 at a side facing the driving disk 62 and arranged around the central hole 621 of the driven disk 62. Each rotating member guiding recess 622 of the driven disk 62 has a depth gradually increased along the first rotating direction (clockwise). Each rotating member guiding recess 622 has a slope gradually decreased along the second rotating direction (counterclockwise).

The rotating members 63 are mounted respectively in the rotating member guiding recesses 621, 622 in the driving and driven disks 61,62.

With reference to FIGS. 3 to 5, the friction member 64 is mounted in the outer segment of the holding recess 35 and abuts the shoulder 351. The friction member 64 has a central hole 641 defined through the friction member 64. A sleeve 642 is mounted in the central hole 641. Three engaging recesses 643 are defined in a periphery of the friction member 64 and are engaged respectively with the protrusions 352 in the holding recess 35, such that the friction member 64 is non-rotatable but moveable in the outer segment of the holding recess 35. A side of the friction member 64 facing the driven disk 62 abuts a side of the driven disk 62. When the driven disk 62 is pushed to move axially by the rotating members 63 and to abut against the friction member 64, the friction member 64 can provide a friction to the driven disk 62. In the first embodiment, the friction member 64 has an annular groove 644 defined in the friction to hold and position a rubber holding ring 645 inside. Before the driven disk 62 is moved axially, the holding ring 645 abuts with the driven disk 62.

The adjusting bolt 66 has a driven recess 661, a shank 662, and a threaded segment 663. The driven recess 661 has a hexagonal section and is defined in an end of the adjusting bolt 66. The shank 662 has a diameter larger than that of the threaded segment 663. The shank 662 is mounted through the central holes 641,621 in friction member 64 and the driving disk 62, and the threaded segment 663 is mounted through the central hole 611 in the driving disk 61 and is screwed with the second threaded hole 322 in the axle 32. At least one washer 67 is mounted between adjusting bolt 66 and the friction member 64.

The preload spring 65 is mounted around the shank 662 of the adjusting bolt 66 and has two ends abutting respectively with the adjusting bolt 66 and the friction member 64. The preload spring 64 may be a compressed spring, a wave spring, a disk spring, or a resilient tube. In the first embodiment, the preload spring 65 is a conical compressed spring.

With reference to FIGS. 4 to 6 and 8, three rotating member guiding recesses 612,622 are defined in each of the driving disk 61 and the driven disk 62, and three rotating members 63 are mounted in the rotating member guiding recesses 612,622 in the driving and driven disks 61,62.

Figure 8:
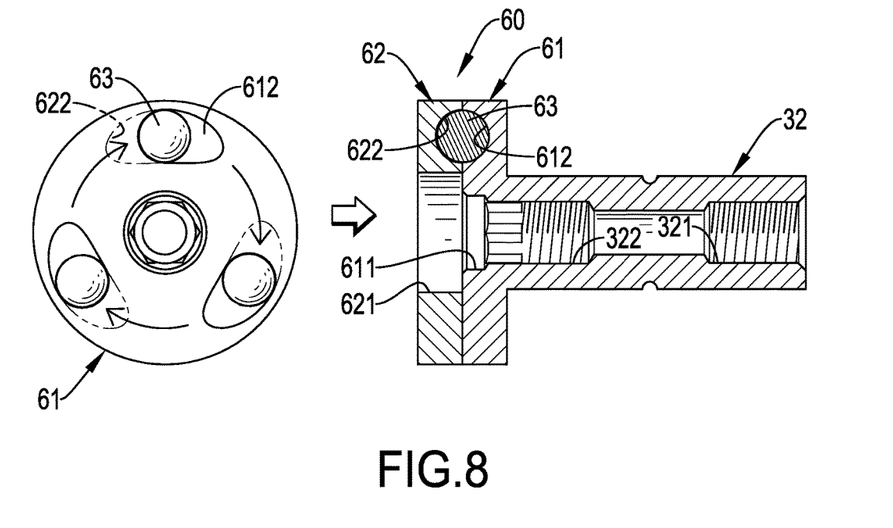
FIG. 8 shows an operational end view and an operational side view in partial section of the friction assembly in FIG. 7 when the axle is rotated in clockwise (first rotating direction)
Figure 9:
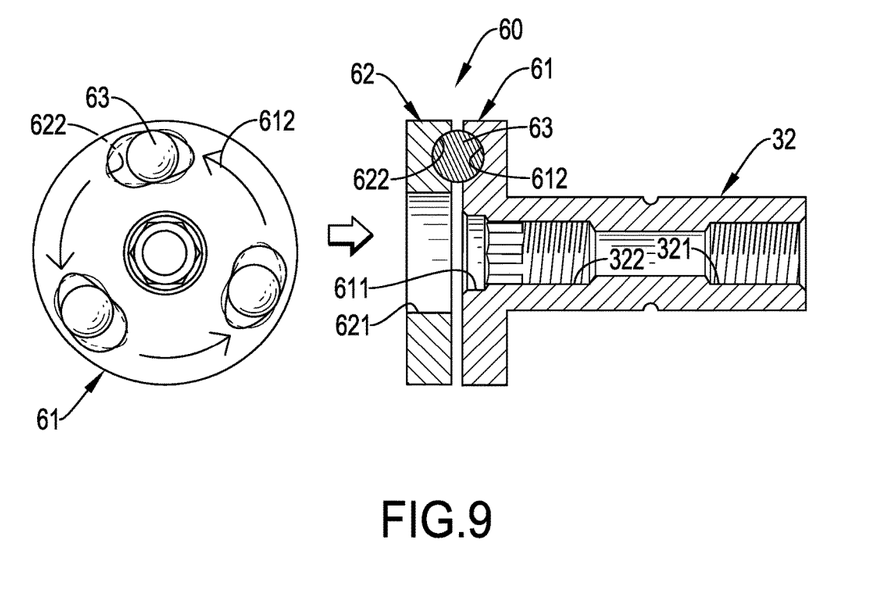
FIG. 9 shows an operational end view and an operational side view in partial section of the friction assembly in FIG. 7 when the axle is rotated in counterclockwise (second rotating direction)

When the chain guide 40 is rotated in the first rotating direction (clockwise), the chain guide 40 will drive the axle 32 and the driving disk 61 to rotate in the first rotating direction. Because each rotating member guiding recess 612 of the driving disk 61 has a depth gradually increased along the second rotating direction (counterclockwise) and each rotating member guiding recess 622 of the driven disk 62 has a depth gradually increased along the first rotating direction, the rotating members 63 will be kept from moving along the rotating member guiding recesses 612,622 while the driving disk 61 is rotated in the first rotating direction. Consequently, the driven disk 62 will be driven to rotate with the driving disk 61, and the friction member 64 is kept from abut the driven disk 62 and does not provide friction to the driven disk 62. Accordingly, the recoil force provided by the torsion spring 34 will be effectively applied to the chain guide 40, and the chain can be effectively tightened by the chain guide 40 and can be prevented from being loosened while the bicycle is riding in a rugged road condition.

With reference to FIGS. 4 to 6 and 9, when the bicycle is riding in a rugged road condition and the chain guide 40 is rotated in the second rotating direction (counterclockwise) due to shock or bump, the chain guide 40 will drive the axle 32 and the driving disk 61 to rotate in the second rotating direction. Because each rotating member guiding recess 612 of the driving disk 61 has a depth gradually decreased along the first rotating direction (clockwise) and each rotating member guiding recess 622 of the driven disk 62 has a depth gradually decreased along the second rotating direction, the rotating members 63 will move along the rotating member guiding recesses 612,622 while the driving disk 61 is rotated in the second rotating direction. Consequently, the rotating members 63 will push the driven disk 62 toward and to abut against the friction member 64. Because the friction member 64 is non-rotatable relative to the holding recess 35, the friction member 64 will provide a friction to the driven disk 62. Accordingly, the friction assembly 60 can provide a friction to the chain guide 40 along the second rotating direction, and the chain can be prevented from being loosened while the bicycle is riding in a rugged road condition.

Figure 7:
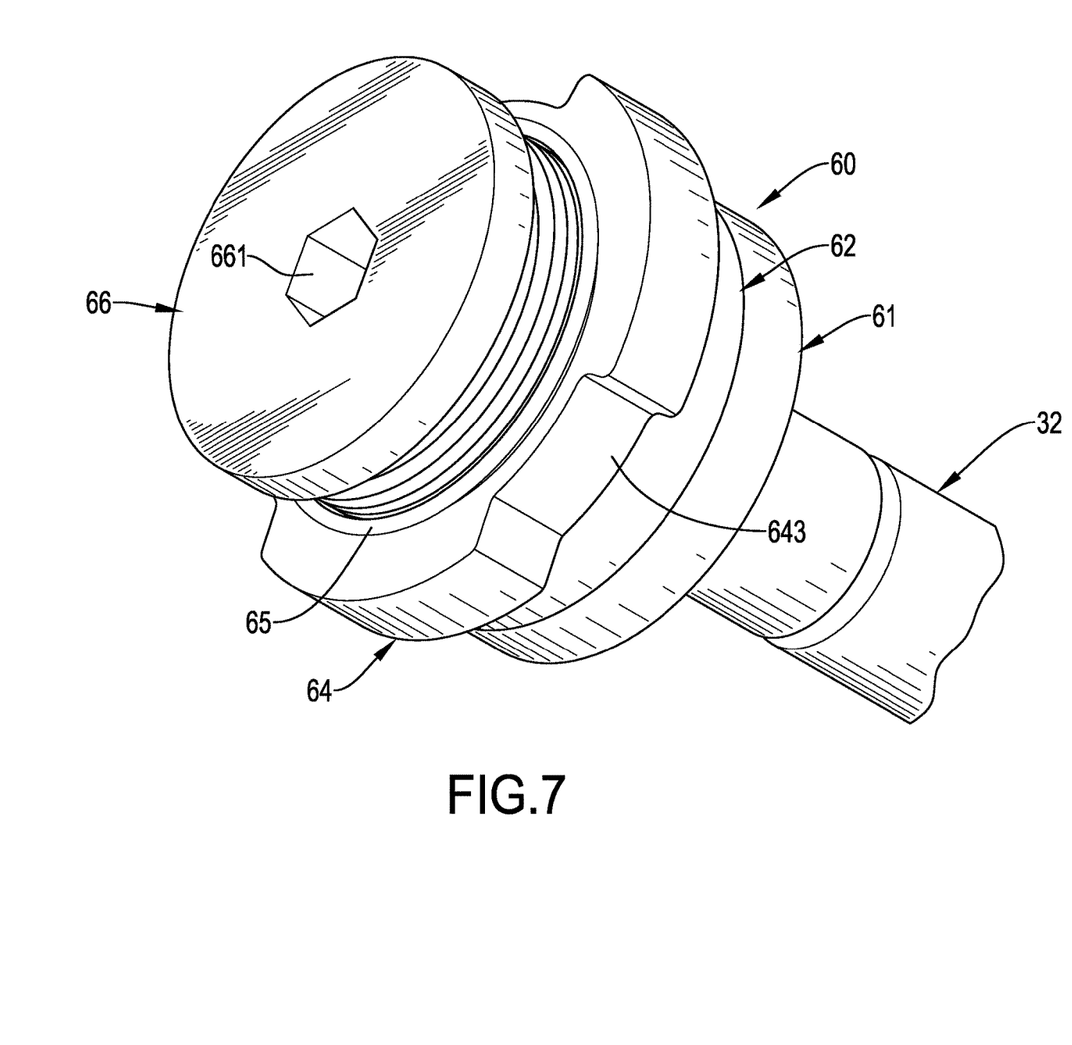
FIG. 7 is an enlarged perspective view of the friction assembly in FIG. 3.

With reference to FIGS. 2, 5, and 7, with such an arrangement, the rear derailleur in accordance with the present invention has a simplified structure and is easily assemble, and a friction can be actually applied to the chain guide 40. Specially, three rotating member guiding recesses 612,622 with gradually varied slopes are respectively defined in each of the driving disk 61 and the driven disk 62 and the rotating members 63 are moveably mounted in the rotating member guiding recesses 612,622, the friction applied to the chain guide 40 in the second rotating direction can be gradually increased when the chain guide 40 is applied with different bumps or shocks. Accordingly, the rear derailleur can fit with different road conditions.

With reference to FIGS. 5 and 7, the resilient force provided by the preload spring 65 can be adjusted by rotating the adjusting bolt 66, or the adjusting bolt 66 can be rotated to abut against the friction member 64 to fit with different needs of different users.

Figure 10:
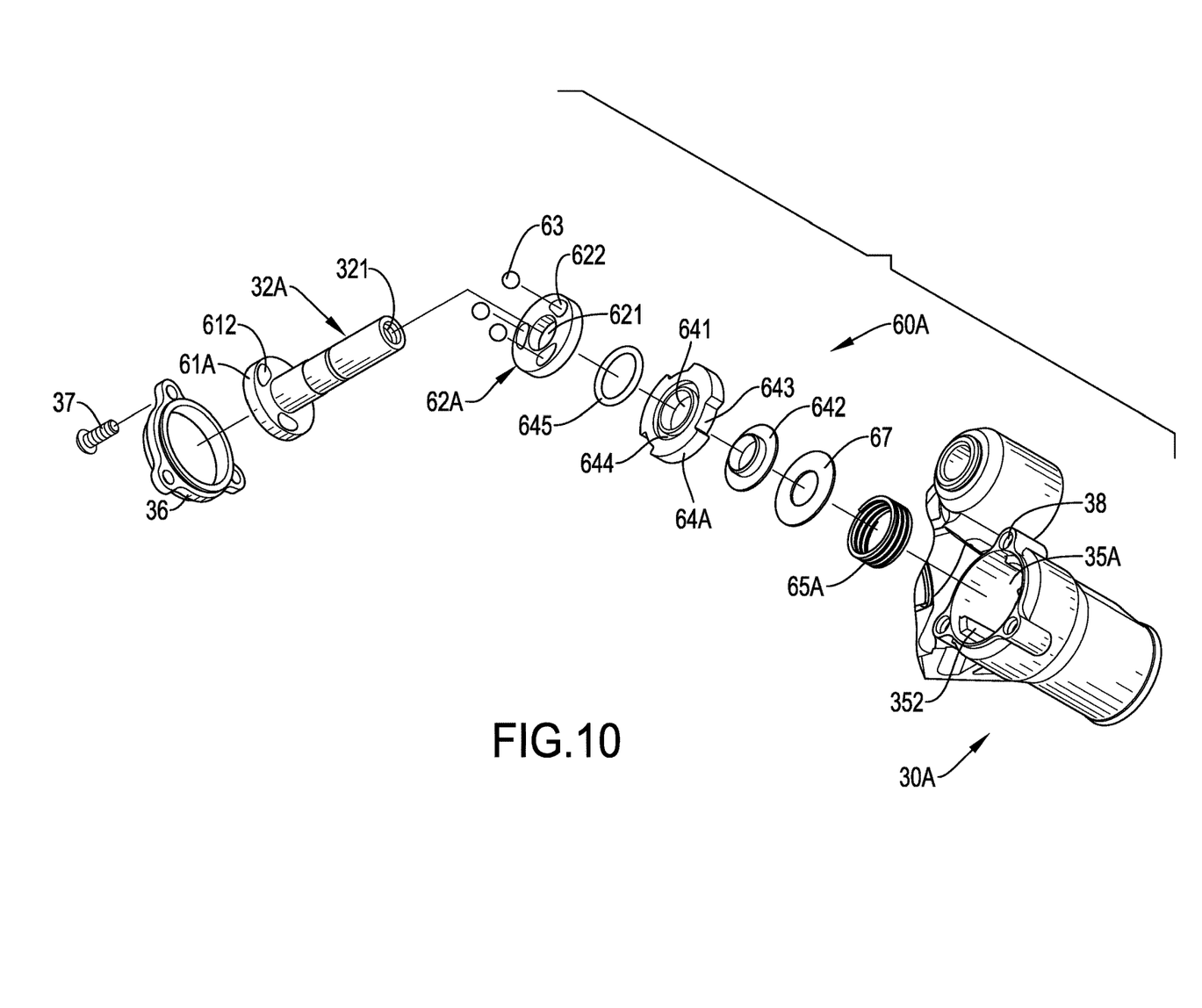
FIG. 10 is an exploded perspective view of a second embodiment of a moveable base and a friction assembly of the rear derailleur in FIG. 2.
Figure 11:
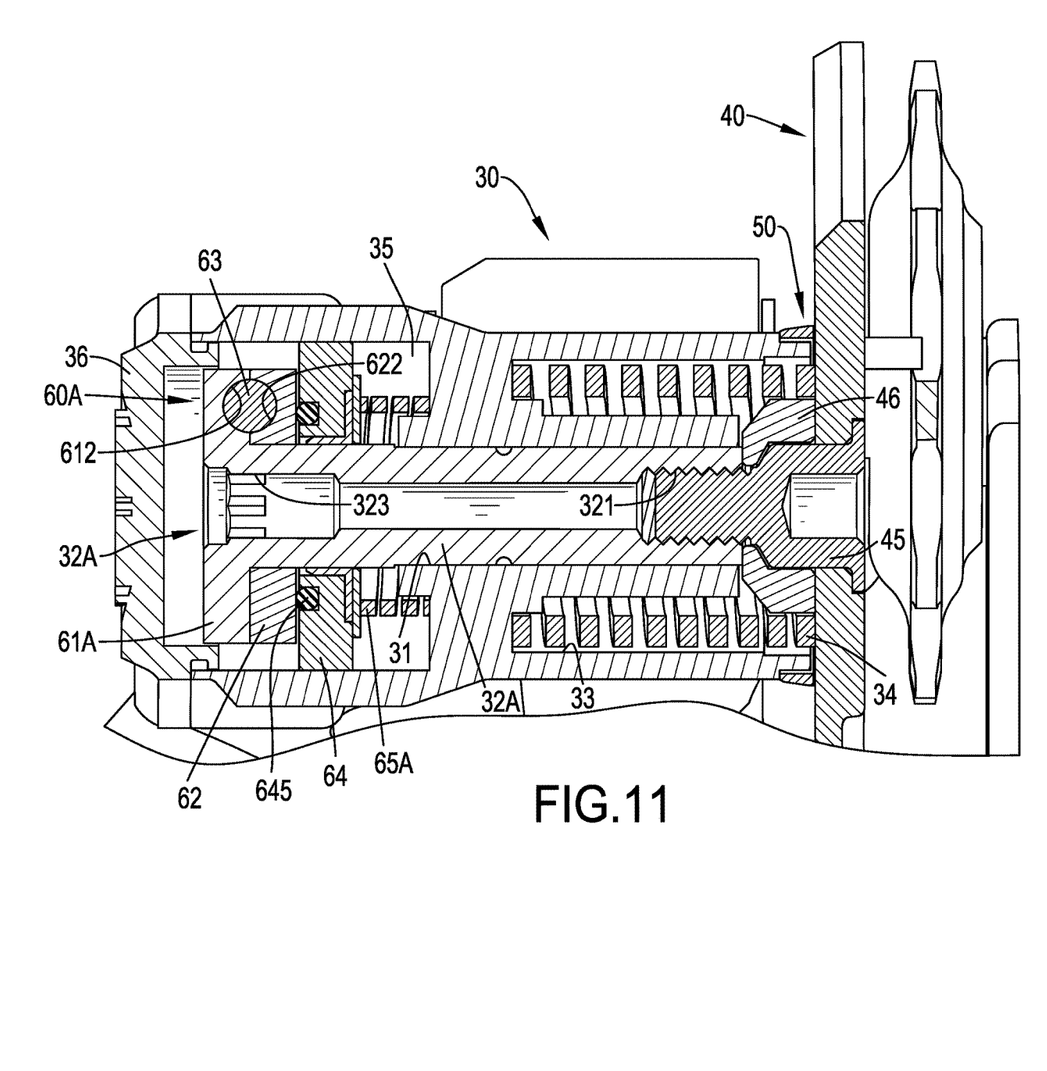
FIG. 11 is an enlarged side view in partial section of the moveable base and the friction assembly in FIG. 10.

With reference to FIGS. 10 and 11, in the second embodiment in accordance with the present invention, the axle 32A of the moveable base 30A has a length substantially equal to the sum of the lengths of the axle hole 31 and the holding recess 35A. The axle 32A has two ends respectively with a threaded hole 321 and a tool hole 323 that is applied to be inserted by a tool. Three protrusions 362 are formed on the inner surface of the holding recess 35A.

The friction assembly 60A comprises a driving disk 61A, a driven disk 62A, three rotating members 63, a friction member 64A, and a preload spring 65A. The driving disk 61A is connected with an end of the axle 32A in a non-rotatable manner. In the embodiment as shown in FIGS. 10 and 11, the driving disk 61A is integrally formed with the axle 32A as a single part. Three curved rotating member guiding recesses 612 are defined in the driving disk 61A at a side facing the chain guide 40 and arranged around the axle 32A at even angular intervals. Each rotating member guiding recess 612 has a depth gradually increased along the second rotating direction (counterclockwise). Each rotating member guiding recess 612 has a slope gradually decreased along the first rotating direction (clockwise).

The driven disk 62A is rotatably and axially moveably mounted around the axle 32A. The driven disk 61A has a central hole 621 defined through the center of the driven disk 62A, and the axle 32A is mounted through the central hole 621. The driven disk 62A has three curved rotating member guiding recesses 622 defined in the driven disk 62A at a side facing the driving disk 61A and arranged around the central hole 621 of the driven disk 62A at even angular intervals. Each rotating member guiding recess 622 of the driven disk 62A has a depth gradually increased along the first rotating direction (clockwise). Each rotating member guiding recess 622 has a slope gradually decreased along the second rotating direction (counterclockwise). The rotating member guiding recesses 612,622 in the driving disk 61A and the driven disk 62A are respectively aligned with each other. The rotating members 63 are mounted respectively between the guiding recesses 612,622 of the driving disk 61A and the driven disk 62A.

The friction member 64A may be a round disk and is axially moveably mounted around the axle 32A. The friction member 64A has a central hole 641 defined through the friction member 64A, and the axle 32A is mounted through the central hole 641 in the friction member 64A. A sleeve 642 is mounted in the central hole 641. Three engaging recesses 643 are defined in a periphery of the friction member 64A and are engaged respectively with the protrusions 352 in the holding recess 35A, such that the friction member 64A is non-rotatable but moveable in the holding recess 35A. A side of the friction member 64A facing the driven disk 62A abuts a side of the driven disk 62A. When the driven disk 62A is pushed to move axially by the rotating members 63 and to abut against the friction member 64A, the friction member 64A can provide a friction to the driven disk 62A. In the second embodiment, the friction member 64A has an annular groove 644 defined in the friction member 64A to hold and position a rubber holding ring 645 inside.

The preload spring 65A is mounted around the axle 32A and has two ends abutting respectively with the friction member 64A and the bottom of the holding recess 35A. The preload spring 65A may be a compressed spring, a wave spring, a disk spring, or a resilient tube. A washer 67 is mounted between the preload spring 65A and the friction member 64A.

With reference to FIGS. 10, 11, and 5, the operation of the second embodiment is same as that of the first embodiment and is omitted.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bicycle rear derailleur comprising:
    a mounting base;
    a moveable base moveably connected with the mounting base and having:
        an axle mounted in the moveable base; and
        a torsion spring;
    a chain guide connected with the axle in a non-rotatable manner and applied with a recoil force provided by the torsion spring in a first rotating direction; and
    a friction assembly mounted in the moveable base to provide a friction to the axle and comprising:
        a driving disk connected with the axle in a non-rotatable manner;
        a driven disk rotatably and axially moveably mounted in the moveable base being adjacent to the driving disk, wherein
        the driving disk has multiple curved rotating member guiding recesses defined in the driving disk at a side facing the driven disk and arranged around a center of the driving disk, and each rotating member guiding recess has a depth decreased along the first rotating direction; and
        the driven disk has multiple curved rotating member guiding recesses defined in the driven disk at a side facing the driving disk and arranged around a center of the driven disk, and each rotating member guiding recess of the driven disk has a depth decreased along a second rotating direction opposite to the first rotating direction;
        multiple rotating members mounted respectively in the rotating member guiding recesses in the driving and driven disks; and
        a friction member mounted in the moveable base in a non-rotatable manner and abutting the driven disk.

2. The bicycle rear derailleur as claimed in claim 1, wherein
    the moveable base further has
        an axle hole defined in the moveable base;
        a holding recess defined in the moveable base and communicating with the axle hole; and
        multiple protrusions formed on and protruding from an inner surface of the holding recess;
    the friction assembly is mounted in the holding recess in the moveable base; and
    the friction member further has multiple engaging recesses defined in a periphery of the friction member and engaged respectively with the protrusions in the holding recess.

3. The bicycle rear derailleur as claimed in claim 2, wherein the driving disk is integrally formed with the axle as a single part.

4. The bicycle rear derailleur as claimed in claim 3, wherein the friction member further has a supporting ring mounted on the friction member at a side facing the driven disk.

5. The bicycle rear derailleur as claimed in claim 4, wherein
    each of the driving disk and the driven disk has three said rotating member guiding recesses; and
    each rotating member guiding recess in the driving disk and the driven disk has a slope to form a deep end and a shallow end of the rotating member guiding recess.

6. The bicycle rear derailleur as claimed in claim 5, wherein
   the driven disk is rotatably and axially moveably mounted around the axle; and
   the axle is rotatably mounted through the friction member.

7. The bicycle rear derailleur as claimed in claim 6, wherein
   the friction member is axially moveably mounted in the holding recess; and
   a preload spring is mounted between the friction member and a bottom of the holding recess.

8. The bicycle rear derailleur as claimed in claim 2, wherein
   the holding recess has a shoulder formed in the holding recess;
   the friction member abuts the shoulder in the holding recess; and
   a preload spring is mounted in the holding recess and abuts against the friction member.

9. The bicycle rear derailleur as claimed in claim 8, wherein
   the driving disk and the driven disk each respectively have a central hole defined through the driving disk and the driven disk;
   the friction assembly further comprises an adjusting bolt mounted through the central holes in the driving disk and the driven disk and screwed with the axle; and
   the preload spring is mounted around the adjusting bolt.

10. The bicycle rear derailleur as claimed in claim 2, wherein
    the holding recess has a shoulder formed in the holding recess;
    the friction member abuts the shoulder in the holding recess; and
    a preload spring is mounted in the holding recess and abuts against the friction member.

11. The bicycle rear derailleur as claimed in claim 10, wherein
    the driving disk and the driven disk each respectively have a central hole defined through the driving disk and the driven disk;
    the friction assembly further comprises an adjusting bolt mounted through the central holes in the driving disk and the driven disk and screwed with the axle; and
    the preload spring is mounted around the adjusting bolt.

12. The bicycle rear derailleur as claimed in claim 2, wherein
    the driven disk is rotatably and axially moveably mounted around the axle; and
    the axle is rotatably mounted through the friction member.

13. The bicycle rear derailleur as claimed in claim 12, wherein
    the friction member is axially moveably mounted in the holding recess; and
    a preload spring is mounted between the friction member and a bottom of the holding recess.

14. The bicycle rear derailleur as claimed in claim 1, wherein
    the driven disk is rotatably and axially moveably mounted around the axle; and
    the axle is rotatably mounted through the friction member.

* * * * *